(12) United States Patent
Sato et al.

(10) Patent No.: US 9,086,063 B2
(45) Date of Patent: Jul. 21, 2015

(54) PUMP APPARATUS

(71) Applicant: SEIKO EPSON CORPORATION, Tokyo (JP)

(72) Inventors: Seiya Sato, Matsumoto (JP); Akihiko Maruyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 13/751,602

(22) Filed: Jan. 28, 2013

(65) Prior Publication Data

US 2013/0195630 A1     Aug. 1, 2013

(30) Foreign Application Priority Data

Jan. 30, 2012   (JP) .................... 2012-016904

(51) Int. Cl.
| | |
|---|---|
| *F16D 3/00* | (2006.01) |
| *F04B 43/08* | (2006.01) |
| *F04B 43/12* | (2006.01) |

(52) U.S. Cl.
CPC ............. *F04B 43/08* (2013.01); *F04B 43/1253* (2013.01); *F16D 3/00* (2013.01)

(58) Field of Classification Search
CPC .......... F04D 3/00; F04B 43/08; F04B 53/006; F16D 3/00; F16D 3/02; F16D 3/14; F16D 3/66; F16C 1/02; B41J 2/175
USPC ........ 417/474, 475, 476, 477.1, 477.2, 477.3, 417/477.4, 477.5, 477.6, 477.8, 477.9, 417/477.11, 477.12, 477.13, 477.14; 464/57, 60, 160

See application file for complete search history.

(56) References Cited

U.S. PATENT DOCUMENTS

| | | | | |
|---|---|---|---|---|
| 5,140,747 | A * | 8/1992 | Barnett et al. | 29/888.022 |
| 5,443,451 | A * | 8/1995 | Chapman et al. | 604/153 |
| 5,486,854 | A * | 1/1996 | Uchida | 347/30 |
| 5,884,135 | A * | 3/1999 | Moore | 399/361 |
| 6,019,452 | A | 2/2000 | Hirano et al. | |
| 6,142,622 | A * | 11/2000 | Blanchard et al. | 347/104 |
| 6,220,692 | B1 * | 4/2001 | Iwaya et al. | 347/33 |
| 6,384,508 | B1 * | 5/2002 | Marioni | 310/261.1 |
| 6,491,368 | B1 * | 12/2002 | Cipolla et al. | 347/23 |
| 7,278,719 | B2 * | 10/2007 | Scardovi et al. | 347/85 |
| 2005/0007427 | A1 * | 1/2005 | Bellinger et al. | 347/86 |
| 2005/0174397 | A1 * | 8/2005 | Scardovi et al. | 347/85 |
| 2009/0285706 | A1 * | 11/2009 | Bunoz | 417/477.3 |

FOREIGN PATENT DOCUMENTS

JP     2005-144690     6/2005

* cited by examiner

*Primary Examiner* — Devon Kramer
*Assistant Examiner* — Nathan Zollinger
(74) *Attorney, Agent, or Firm* — Workman Nydegger (57) ABSTRACT

A pump apparatus includes: a stationary shaft; a rotation-regulating member having a coil main body wound around the stationary shaft, the rotation-regulating member being permitted to rotate in a direction of loosening the coil main body and the rotation-regulating member being restrained from rotating in a direction of tightening the coil main body; a driven rotatable member that may rotate around the stationary shaft when a driving force of a driving source is transmitted; and a suction pump that has a rotary member driven together with rotation of the driven rotatable member and that performs a suction operation when the rotary member rotates. The suction pump is configured such that the rotation-regulating member rotates in the tightening direction of the coil main body when the driven rotatable member rotates in a direction opposite to a direction in which the driven rotatable member performs the suction operation.

5 Claims, 7 Drawing Sheets

PUMP APPARATUS

This claims priority to Japanese Patent Application No. 2012-016904 filed on Jan. 30, 2012. The entire disclosure of Japanese Patent Application No. 2012-016904 is expressly incorporated by reference herein.

BACKGROUND

1. Technical Field

The present invention relates to a pump apparatus and more particularly relates to a pump apparatus provided with a tube pump that rotates while pressing a flexible tube.

2. Related Art

For example, in a liquid ejecting apparatus provided with a liquid ejecting head that ejects a liquid onto a medium (a sheet of paper) to perform a process of recording an image or the like, the liquid ejecting apparatus is equipped with a head maintenance mechanism in order to maintain ejection characteristics with which the liquid is suitably ejected from the liquid ejecting head.

In order to maintain various ejection characteristics, in the head maintenance mechanism, for example, the ejection characteristics are recovered by covering the liquid ejecting head with a suction cap and sucking a liquid having increased viscosity from a nozzle by using the suction pump. At this time, a so-called tube pump is often used as the suction pump. The tube pump turns (rotates) a rotary member around a pump shaft driven by a driving power source (a motor) so that the rotary member rotates while pressing a flexible tube.

In a liquid ejecting apparatus, as described in, for example, JP-A-2005-144690, a motor (a paper transport motor) shares a driving power source with a tube pump (an ink suction unit), and thereby the size of the apparatus is decreased. That is, the motor drives the tube pump in one of opposite rotary directions and transports the paper in the other of the opposite rotary directions.

As is well known, when a pump shaft of the tube pump rotates in a given one direction, a rotary member moves away in the outward direction from a rotary axis of the tube pump and the moved rotary member presses the flexible tube due to the radial movement, while the rotary member is rotated around the pump shaft. When the rotary member rotates in one direction while maintaining the position thereof away from the rotary axis, the rotary member presses the flexible tube. A fluid in the tube is ejected in one direction by the rotation of the rotary member, and thereby an operation of sucking the fluid is performed. Thus, the tube pump serves as a suction pump.

Accordingly, in the case where a liquid having a high degree of viscosity is to be sucked from the nozzle, if a motor rotates in, for example, a normal direction to rotate the rotary member of the tube pump in a given direction to perform a suction operation and then the motor stops rotating temporarily, the tube pump stops the rotary member from rotating in the one direction, thereby ceasing the sucking operation. At this time, there is a case where the rotary member in the tube pump is turned in a direction opposite to the one direction by a reaction force from the pressed flexible tube and the rotary member moves in the inward direction. As a result, the pressing state of the flexible tube, that is, a state in which the sucking operation is able to be performed cannot be maintained and the pressing state is released. Thus, in the case where the rotary member starts rotation again in the normal direction to suck the liquid having increased viscosity, it is necessary for the rotary member to move away in the outward direction from the rotary axis so as to press the flexible tube until the state in which the sucking operation is able to be performed is restored. Thus, there is a problem that the amount of ink that is sucked is unstable due to this rotation.

SUMMARY

An advantage of some aspects of the invention is that a pump apparatus may prevent a rotary member from rotating in a direction opposite to a direction of a sucking operation of a suction pump, thereby maintaining the sucking operation.

According to an aspect of the invention, a pump apparatus includes: a stationary shaft; a rotation-regulating member having a coil main body wound around the stationary shaft, the rotation-regulating member being permitted to rotate in a direction of loosening of the coil main body to increase a diameter of the coil main body and the rotation-regulating member being restrained from rotating in a direction of tightening of the coil main body to decrease the diameter of the coil main body; a driven rotatable member to which an end of the coil main body of the rotation-regulating member is attached, the driven rotatable member being able to rotate around the stationary shaft when a driving force of a driving source is transmitted to the driven rotatable member; and a suction pump having a rotary member that is driven together with rotation of the driven rotatable member, the suction pump being configured to perform a suction operation when the rotary member rotates while pressing a flexible tube. The suction pump is configured such that the rotation-regulating member rotates in the tightening direction of the coil main body when the driven rotatable member rotates in a direction opposite to a direction in which the driven rotatable member performs the suction operation.

According to the above aspect of the invention, since the rotation in the direction opposite to the direction of the suction operation of the driven rotatable member is restrained by the rotation-regulating member that becomes the tightening state, the suction pump maintains the state in which the rotation member presses the flexible tube, that is, the suction operation state.

It is preferable that the pump apparatus according to the aspect of the invention further includes a driving-force transmission assembly that transmits the driving force of the driving source to the driven rotatable member. The coil main body of the rotation-regulating member is provided on the other end thereof opposite to the end thereof attached to the driven rotatable member with a contact portion that the driving-force transmission assembly can contact. When the driving-force transmission assembly contacts the contact portion of the rotation-regulating member, the driving-force transmission assembly turns the rotation-regulating member in the loosening direction such that the diameter of the coil main body is increased and turns the driven rotatable member in a direction opposite to the rotary direction in which the suction operation is performed.

According to the above aspect of the invention, in the case where the suction pump is released from the state in which the rotary member presses the tube, since the driven rotatable member is turned in the state in which the other end of the coil main body of the rotation-regulating member is loosened around the stationary shaft, it is possible to turn the driven rotatable member with a low load.

It is preferable that the suction pump in the pump apparatus according to the aspect of the invention performs the suction operation, when the driving force is transmitted from the driving-force transmission assembly to the driven rotatable member and the driven rotatable member rotates in the loosening direction of the coil main body of the rotation-regulating member.

According to the above aspect of the invention, since the driven rotatable member is turned in the state in which the rotation-regulating member is loosened around the stationary shaft when the driven rotatable member is turned by the driving force transmitted from the driving source and the suction pump performs the suction operation, it is possible for the suction pump to perform the suction operation with a low load.

It is preferable that the driving-force transmission assembly in the pump apparatus according to the aspect of the invention has an unable-to-transmit rotary range in which the driving force of the driving source is not transmitted to the driven rotatable member during a period from a time when the driving force of the driving source is transmitted to the driven rotatable member by the rotation of the driving-force transmission assembly to cause the suction pump to perform the suction operation to a time when the driving force of the driving source is transmitted to the driven rotatable member in a rotary direction opposite to the rotary direction in which the suction operation is performed.

According to the above aspect of the invention, it is possible to utilize the driving force of the driving source other than the suction operation while the rotary member maintains to press the flexible tube in the suction pump. Accordingly, it is possible to share the driving force of the driving source in the unable-to-transmit rotary range to the other operation and it is possible to immediately start the suction operation when the suction operation must be performed again.

It is preferable that the rotation-regulating member in the pump apparatus according to the aspect of the invention includes the coil main body that has at least one helical turn.

According to the above aspect of the invention, it is possible to configure the rotation-regulating member by a simple structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring now to the drawings, an embodiment will be described in which the invention is implemented as a pump apparatus to be used when performing maintenance on a liquid ejecting head in an ink jet printer (hereinafter abbreviated to a "printer", as required), which is a kind of liquid ejecting apparatus having a liquid ejecting head for ejecting a liquid such as an ink.

Figure 1:
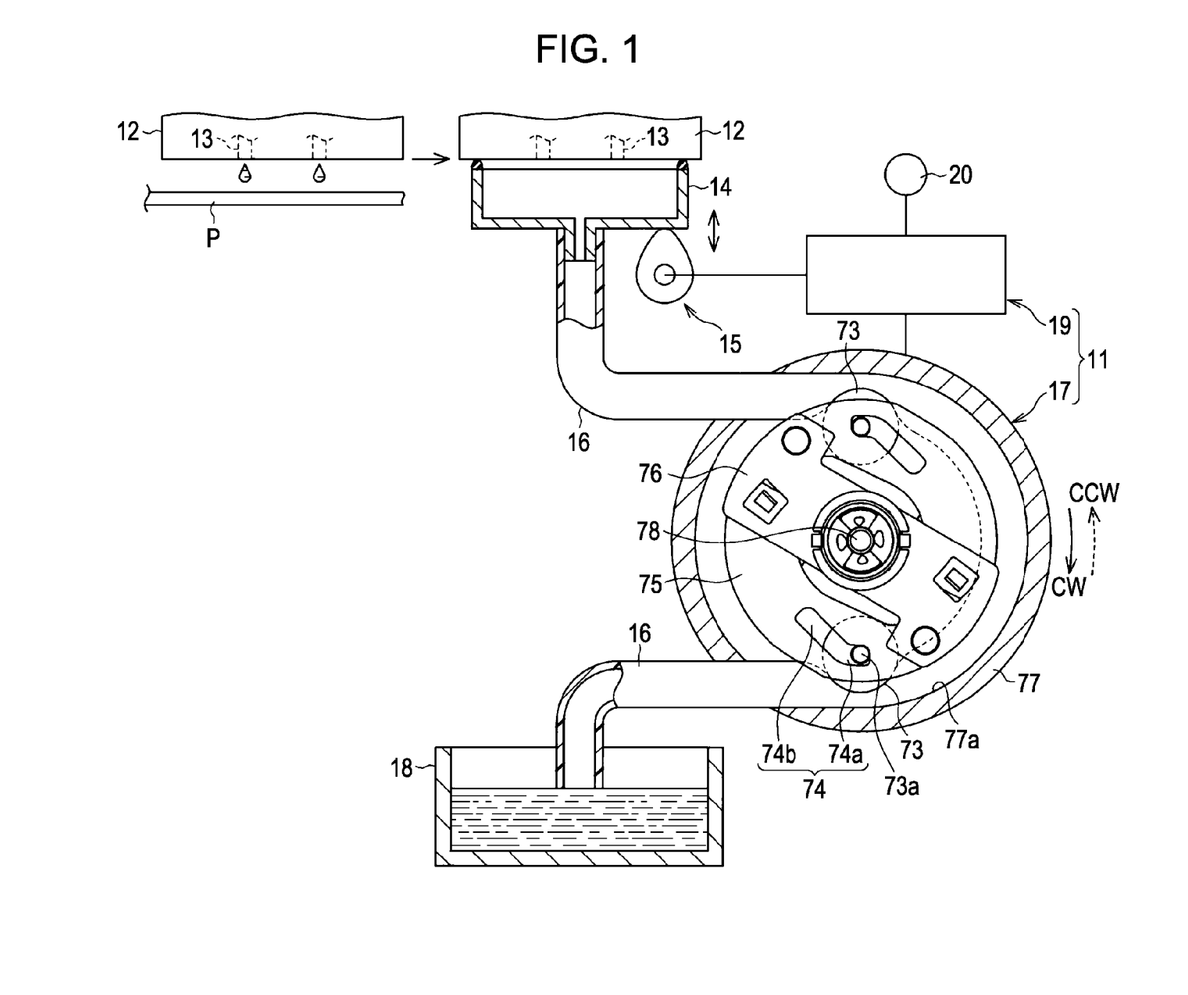
FIG. 1 is an explanatory view that illustrates a schematic construction of a maintenance system having a pump apparatus according to an embodiment of the invention.

As shown in FIG. 1, in the printer, a liquid ejecting head 12 opposes paper P (an example of a medium) and nozzles 13 provided in the liquid ejecting head 12 eject an ink onto the paper P to print an image or the like. Accordingly, the liquid ejecting head is subjected to maintenance at a given timing so that the ink is correctly ejected from the nozzles 13 in accordance with the image to be printed. That is, a maintenance system is disposed in the printer in an area outside a printing area for the paper P and the liquid ejecting head 12 is moved to a position of the maintenance system. The liquid ejecting head 12 is subjected to maintenance by sucking ink having a high degree of viscosity from the nozzles 13.

In detail, the maintenance system includes a cap 14 that is elevated by an elevating mechanism 15 so as to come into contact with the liquid ejecting head 12 and surround the nozzles 13, and flexible tubes 16 each having one end connected to the cap 14 and the other end inserted into a drain container 18. The maintenance system includes a suction pump 17 that is located on intermediate section of the tubes 16 between the cap 14 and the drain container 18 and that operates to suck the content of the cap 14 toward the drain container 18, and a driving mechanism 19 that drives the suction pump 17. In the maintenance system, the suction pump 17 and driving mechanism 19 constitute a pump apparatus 11. The driving mechanism 19 is driven by a motor 20.

The suction pump 17 is a so-called tube pump. Two rotary members such as rollers 73 are located along an inner wall 77a of a pump casing 77 at positions that oppose each other with a pump shaft 78 interposed therebetween. The rollers 73 rotate while pressing the tubes 16 that are bent into a substantially semi-circular shape. Thus, the suction pump 17 exerts a pumping action.

That is, two rotary plates 76 are secured to the pump shaft 78 and are spaced away from each other and rotate together with the pump shaft 78. A wheel plate 75 is attached to each rotary plate 76 and rotates together with the respective rotary plate 76. The two wheel plates 75 oppose each other on the pump shaft 78. Each of the two wheel plates 75 includes a side plate. The two side plates are spaced away from each other by a given distance on the pump shaft 78. Each side plate is provided with a bent long slot 74. The two bent long slots 74 in the two side plates overlap in the axial direction of the pump shaft 78. Each bent long slot 74 has a long slot portion 74b that gradually extends longitudinally away from the pump shaft 78 and a short slot portion 74a that is continuous with the long slot portion 74b and is bent from the portion 74b so as to be spaced further away from the pump shaft 78.

The roller axes 73a of the rollers 73 are inserted into and are held in the bent long slots 74 so as to be capable of sliding in the bent long slots 74, respectively. When the wheel plates 75 rotate along the tubes 16 from a side at which the tube 16 is connected to the cap 14 to a side at which the tube 16 is connected to the drain container 18, the rollers 73 are moved away from the long slot portions 74b to the short slot portions 74a while the roller axes 73a slide in the bent long slots 74. Consequently, the rollers 73 are moved in a direction CW away from the pump shaft 78 (a centrifugal direction) while pressing the tubes 16, and the rollers 73 serve as a suction pump. In this embodiment, rotation in a direction shown by the arrow CW is described below as rotation in the direction CW and rotation in a direction shown by an arrow CCW opposite to the direction CW is described below as rotation in the direction CCW.

On the other hand, when the wheel plates 75 rotate in a rotary direction in which the rollers 73 move along the tubes 16 from the side at which the tubes 16 are inserted into the drain container 18 toward the side at which the tubes 16 are connected to the cap 14, that is, in the direction CCW, the roller axes 73a of the rollers 73 slide in the bent long slots 74 so as to move from the short slot portions 74a to the bent long slot portions 74b due to the rotation in the direction CCW. That is, the rollers 73 move toward the pump shaft 78 and release the tubes 16 from the pressing state, thereby preventing the sucked ink from returning again from the side of the drain container 18 to the side of the cap 14. In other words, so long as the wheel plates 75 do not rotate in the direction CCW, the rollers 73 do not release the pressing state of the tubes 16, that is, the suction state and maintain the pressing state.

Figure 2:
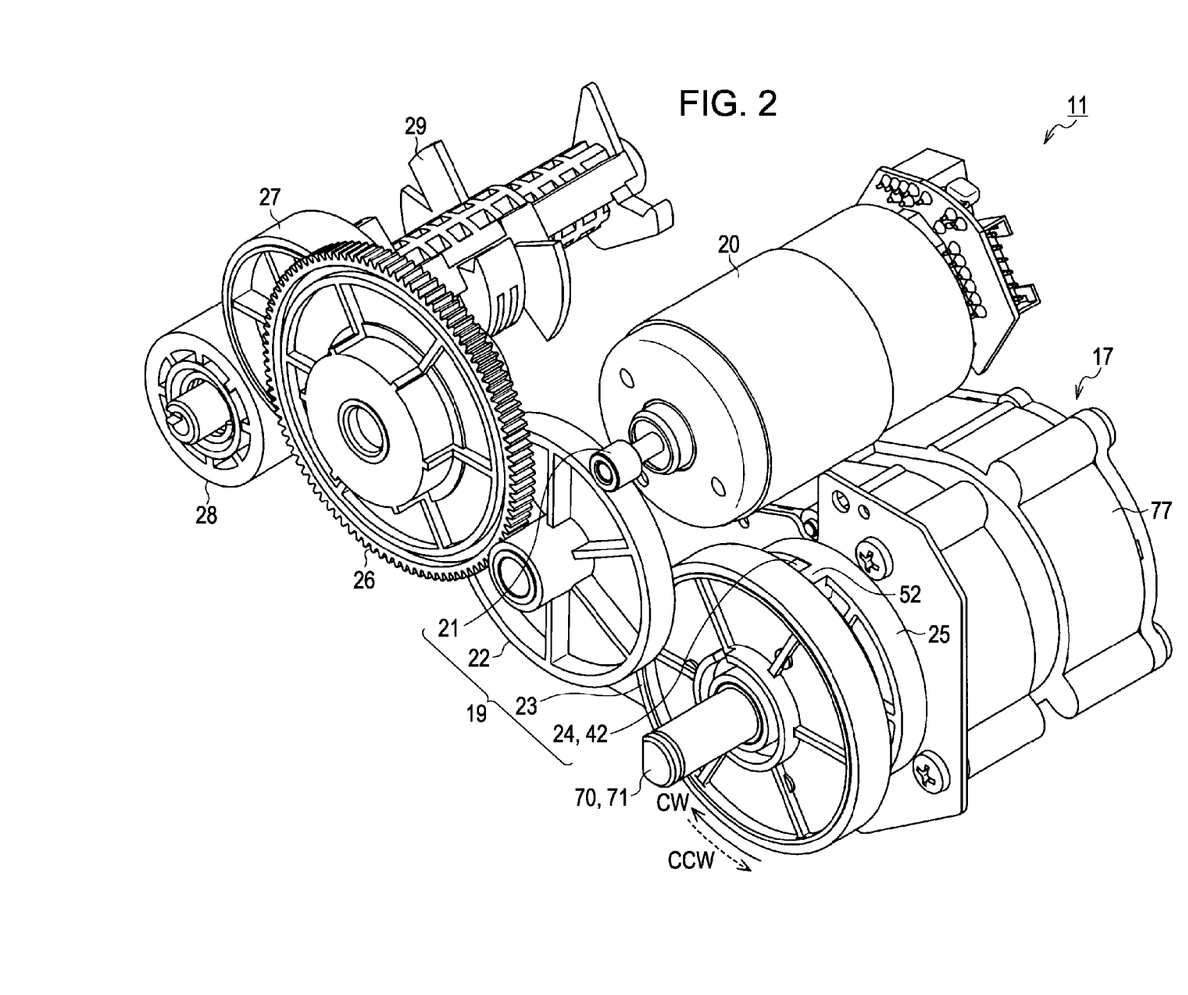
FIG. 2 is a perspective view of a main structure of the pump apparatus according to the embodiment, illustrating the pump apparatus taken in a certain direction.

Accordingly, in the embodiment of the pump apparatus 11 including the suction pump 17 and driving mechanism 19, the driving mechanism 19 does not rotate the wheel plates 75 or the pump shaft 78 in the direction CCW in the suspended state in which the suction operation is suspended and operates to maintain the suspended state. Referring now to FIG. 2, the driving mechanism 19 will be described below. In FIG. 2, teeth to be formed on some of gears are omitted from the gears.

As shown in FIG. 2, the driving mechanism 19 in the embodiment transmits rotation of a motor 20 to a driven rotatable member 25 coupled to the pump shaft 78 (see FIG. 1) of the suction pump 17. A transmission engagement section 55 (see FIG. 4) of the driving mechanism 19 is connected to the pump shaft 78. That is, the driving mechanism 19 includes a pinion 21 attached to an end of a rotary shaft of the motor 20, an intermediate gear 22 that engages with and rotates together with the pinion 21, a transmission gear 23 that engages with and rotates together with a small diameter gear (not shown) provided on the intermediate gear 22, and a rotation transmission member 24 that is rotated by the transmission gear 23. The rotation transmission member 24 transmits the rotation to the driven rotatable member 25.

That is, the transmission gear 23, rotation transmission gear 24, and driven rotatable member 25 are attached to a stationary shaft 70 that is fixed so as not to rotate in the pump apparatus and the gears 23, 24, and the member 25 can rotate about the stationary shaft 70 in the directions CW and CCW, respectively. The driven rotatable member 25 is formed in the shape of a wheel and is provided with a projection 52 on an outer periphery of the wheel. The rotation transmission member 24 is formed in the same wheel shape as the driven rotatable member 25 and is provided with a projection 42 on an outer periphery of the wheel. When the projection 42 of the member 24 comes into contact with the projection 52 of the member 25, the driven rotatable member 25 is turned by the rotation transmission member 24. Accordingly, in the embodiment, the transmission gear 23 and rotation transmission member 24 serve as a driving-force transmission assembly that transmits a driving force of the motor 20 through rotation of the assembly.

In the maintenance system in the embodiment, the rotation of the intermediate gear 22 in the driving mechanism 19 of the pump apparatus 11 is further transmitted to intermediate gears 26, 27, and 28. Operations other than the suction operation are performed by a cam 29 that rotates together with the intermediate gear 28. In detail, when the transmission gear 23 is rotated in the direction CW by the motor 20, the driven rotatable member 25 is rotated in the direction CW by the rotation transmission member 24 to carry out the suction operation of the suction pump 17. When the transmission gear 23 is rotated in the direction CCW, operations other than the suction operation (for example, operations of driving the elevation mechanism 15 and a wiper (not shown)) are carried out.

Accordingly, even if the transmission gear 23 rotates in the direction CCW after rotating in the direction CW in the embodiment, the driven rotatable member 25 does not rotate in the direction CCW within a given rotation angle and maintains the rotation-suspended state by means of a particular mechanism that is provided among the transmission gear 23, the rotation transmission member 24, and the driven rotatable member 25. This particular mechanism will be described below by referring to FIG. 3 and FIG. 4. FIG. 4 is an exploded perspective view of the structure from the rear side of FIG. 3.

Figure 3:
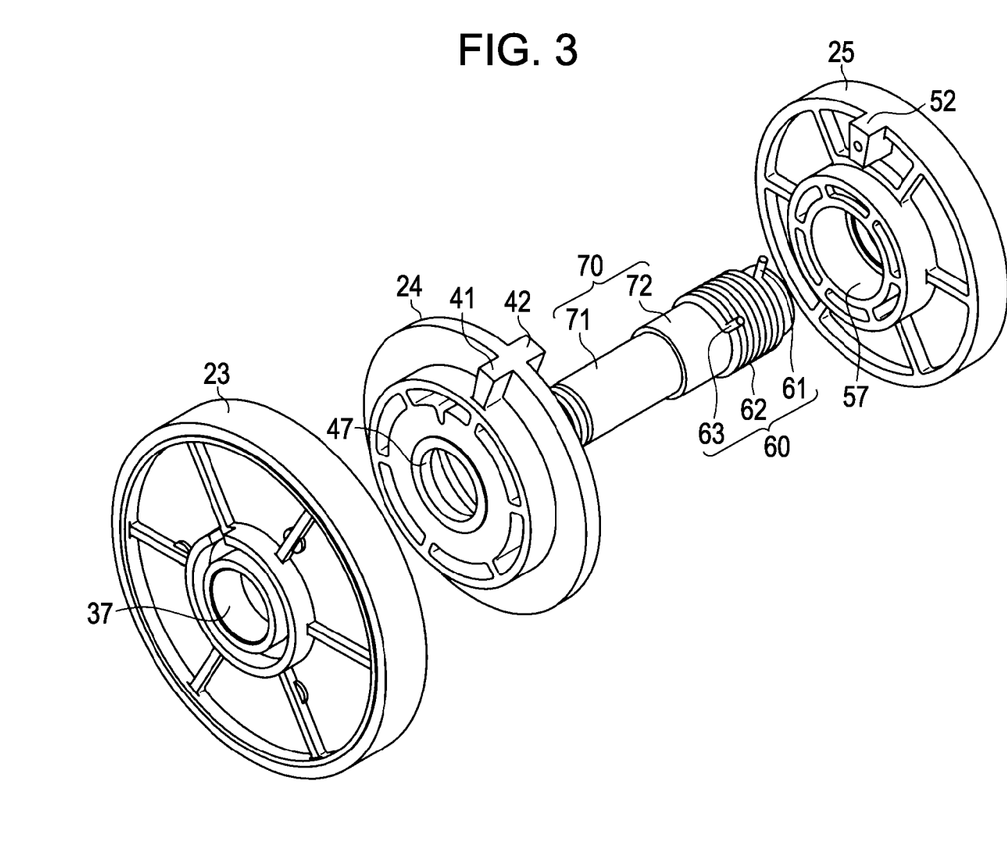
FIG. 3 is an exploded perspective view of a mechanism including a driven rotatable member, a driving-force transmission assembly, and a rotation-regulating member in the pump apparatus according to the embodiment.
Figure 4:
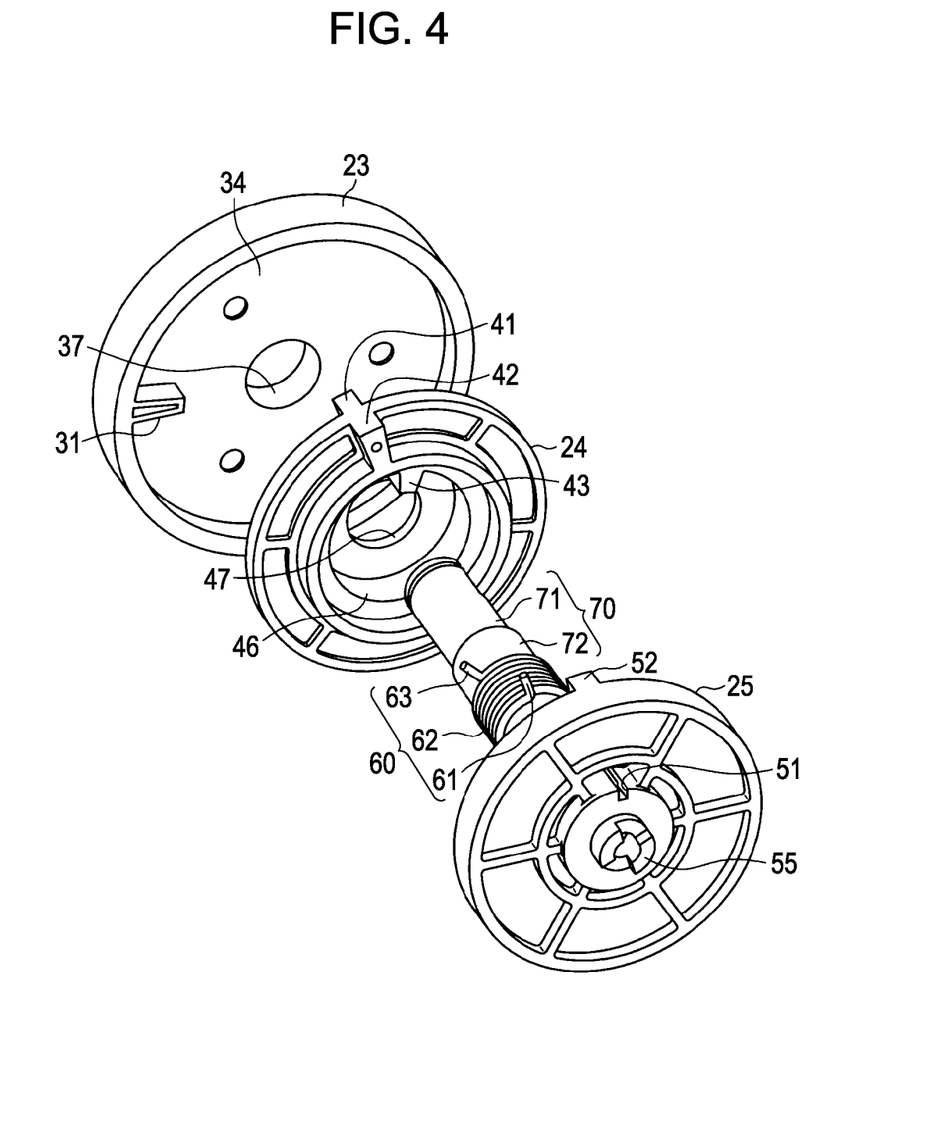
FIG. 4 is an exploded perspective view of the mechanism including the driven rotatable member, the driving-force transmission assembly, and a rotation-regulating member in the pump apparatus according to the embodiment, illustrating the mechanism from a rear side of FIG. 3.

As shown in FIG. 3 and FIG. 4, a stationary shaft 70 is formed by a stepped circular cylinder having a small-diameter shaft portion 71 and a large-diameter shaft portion 72. A coil spring 60 that serves as the rotation-regulating member is wound around the large-diameter shaft portion 72 of the stationary shaft 70. The coil spring 60 is made of a wire material having a circular or polygonal cross section. The coil spring 60 includes a coil main body 62 in which the wire material with a circular or polygonal cross section is wound helically by at least one turn, and a first bent-up end 61 and a second bent-up end 63 that define a starting end and a terminating end of the coil main body 62, respectively, and that are bent up so as to point in the diameter direction of the stationary shaft 70.

In the embodiment, the coil main body 62 of the coil spring 60 is wound closely in the manner of a left-hand screw so that the coil main body 62 contacts the large-diameter shaft portion 72 without there being any clearance therebetween. The wire material for the coil spring 60 is not directly wound around the stationary shaft 70 (the large-diameter shaft portion 72). After the wire material is wound so that an inner diameter of the coil main body 62 substantially matches an outer diameter of the large-diameter shaft portion 72, the coil spring 60 is mounted onto the large-diameter shaft portion 72 while maintaining the coil main body 62 as it is.

The driven rotatable member 25 is rotatably mounted on an end of the large-diameter shaft portion 72, on which the coil spring 60 is mounted. The first bent-up end 61 of the coil spring 60 is secured to the driven rotatable member 25 mounted on the large-diameter shaft portion 72. That is, a cylindrical recess 57 of the driven rotatable member 25 is provided with a slit 51 into which the first bent-up end 61 of the coil spring 60 is inserted. When the driven rotatable member 25 is mounted on the stationary shaft 70, the coil main body 62 of the coil spring 60 does not contact the driven rotatable member 25 in the cylindrical recess 57. An end of the large-diameter shaft portion 72 of the stationary shaft 70 is inserted into the driven rotatable member 25 so that the member 25 can rotate around the stationary shaft 25.

The driven rotatable member 25 mounted on the stationary shaft 70 is provided on a side thereof opposite to the cylindrical recess 57 with a transmission engagement portion 55 that engages with the pump shaft 78 of the suction pump 17 and transmits the rotation of the driven rotatable member 25 to the pump shaft 78.

The small-diameter shaft portion 71 of the stationary shaft 70 is inserted into a shaft bore 47 in the rotation transmission member 24 so that the rotation transmission member 24 opposes the driven rotatable member 25 mounted on the large-diameter shaft portion 72 of the stationary shaft 70 and rotates around the stationary shaft 70. When the rotation transmission member 24 rotates around the stationary shaft on the side opposite to the driven rotatable member 25, the projection 42 provided on the outer periphery of the member 24 contacts the projection 52 provided on the driven rotatable member 25 in the rotation direction. The rotation transmission member 24 is provided on a side thereof opposite to the driven rotatable member 25 with a recess 46. The recess 46 is provided with a projection 43 that extends toward the axial center of the shaft bore 47 and contacts the second bent-up end 63 of the coil spring 60 when the rotation transmission member 24 rotates. On the other hand, the rotation transmission member 24 is provided on its outer periphery and on a side thereof opposite to the driven rotatable member 25 with a projection 41. The projection 41 extends toward the axial line of the stationary shaft 70.

Furthermore, the small-diameter shaft portion 71 of the stationary shaft 70 is inserted into a shaft bore 37 of the transmission gear 23 so that the gear 23 opposes the rotation transmission member 24. The transmission gear 23 can rotate around the stationary shaft 70. The transmission gear 23 is provided on a side thereof opposite to the rotation transmission member 24 with a recess 34. The recess 34 is provided with a projection 31 that extends toward the axial center of the shaft bore 37. The projection 31 contacts the projection 41 of the rotation transmission member 24, when the transmission gear 23 rotates. Accordingly, the rotation of the transmission gear 23 is transmitted to the rotation transmission member 24 as a result of the projection 31 of the transmission gear 23 being in contact with the projection 41 of the member 24.

In the embodiment, in the case where the rotation of the transmission gear 23 is transmitted to the rotation transmission member 24 and the member 24 rotates in the direction CW, the driven rotatable member 25 rotates together with the coil spring 60 in the direction CW. In the case where the rotation transmission member 24 rotates in the direction CCW, the driven rotatable member 25 rotates together with the coil spring 60 in the direction CCW. On the other hand, in the case where even if the rotation transmission member 24 rotates in the direction CCW, the rotation of the transmission gear 23 is not transmitted to the driven rotatable member 25, the driven rotatable member 25 does not rotate in the direction CCW due to resistance of the coil spring 60. Thus, the coil spring serves as an irregular one-way clutch in the embodiment.

Next, referring to FIG. 5, FIG. 6A, FIG. 6B, FIG. 7A, and FIG. 7B, operations of the embodiment including the operation of the coil spring 60 will be described below. For convenience of explanation, the rotation transmission member 24 and driven rotatable member 25 are removed from the stationary shaft 70 in FIG. 5.

Figure 5:
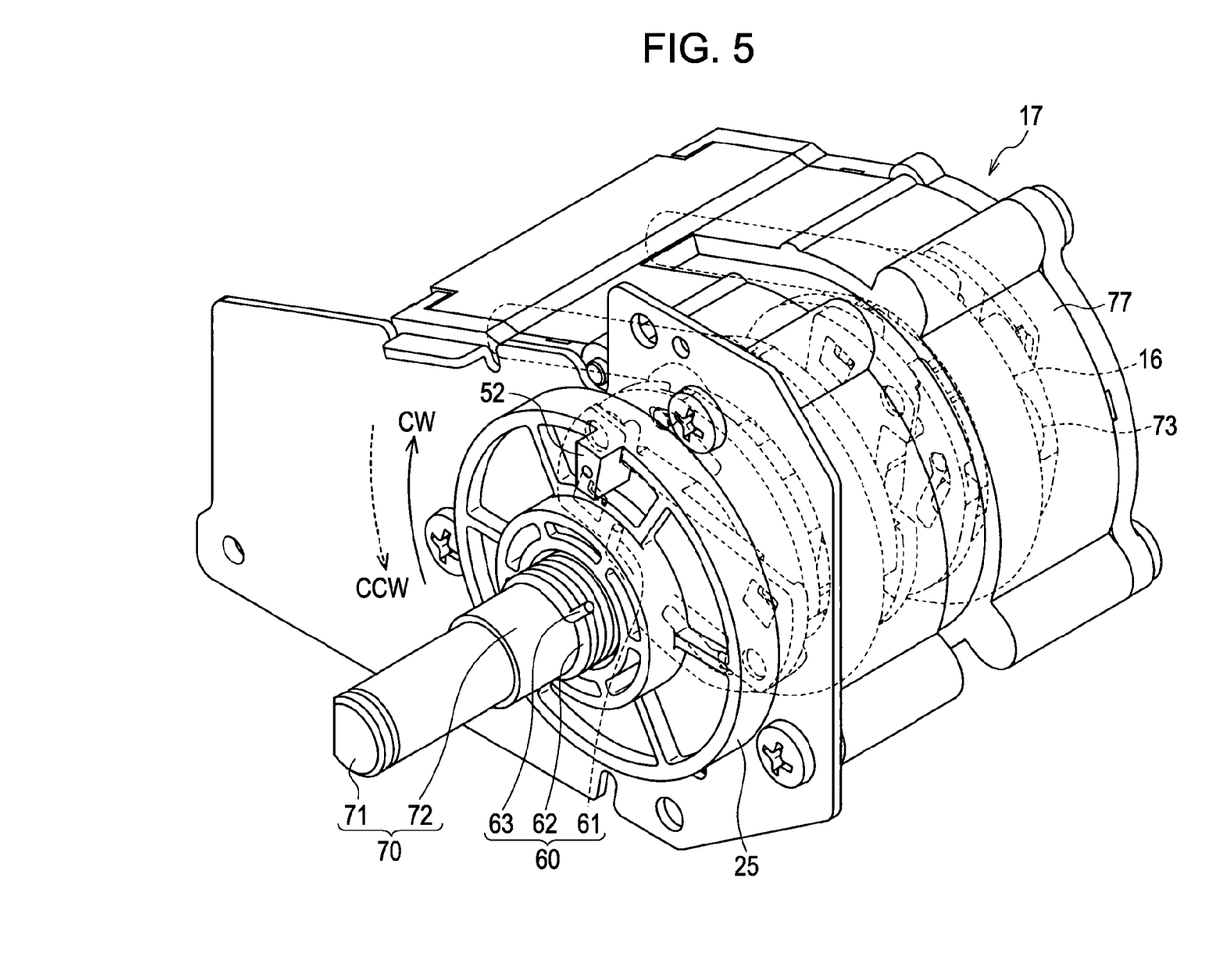
FIG. 5 is a perspective view of the driven rotatable member that transmits a rotation to a suction pump, illustrating the driven rotatable member in a rotary operation.

First, an operation in which the driven rotatable member 25 rotates in the direction CW is explained.

When the projection 52 of the driven rotatable member 25 is pushed by the rotation transmission member 24 and a rotary force is transmitted to the driven rotatable member 25, the member begins to rotate in the direction CW together with the rotation transmission member 24. Then, since the first bent-up end 61 of the coil spring 60 secured to the driven rotatable member 25 rotates around the stationary shaft 70 (the large-diameter shaft portion 72) in a loosening direction of the coil spring 60 so that the wound diameter of the coil main body 62 increases, the coil spring 60 is allowed to rotate in the direction CW. Accordingly, the driven rotatable member 25 rotates together with the rotation transmission member 24 in the direction CW. Consequently, the pump shaft 78 rotates in the direction CW and the rollers 73 rotate while pressing the tubes 16 onto the pump casing 77. In the embodiment, two flexible tubes 16 are located at positions along the axial direction of the pump shaft 78 in the suction pump 17 and the rollers 73 rotate while pressing the two tubes 16.

Figure 6A:
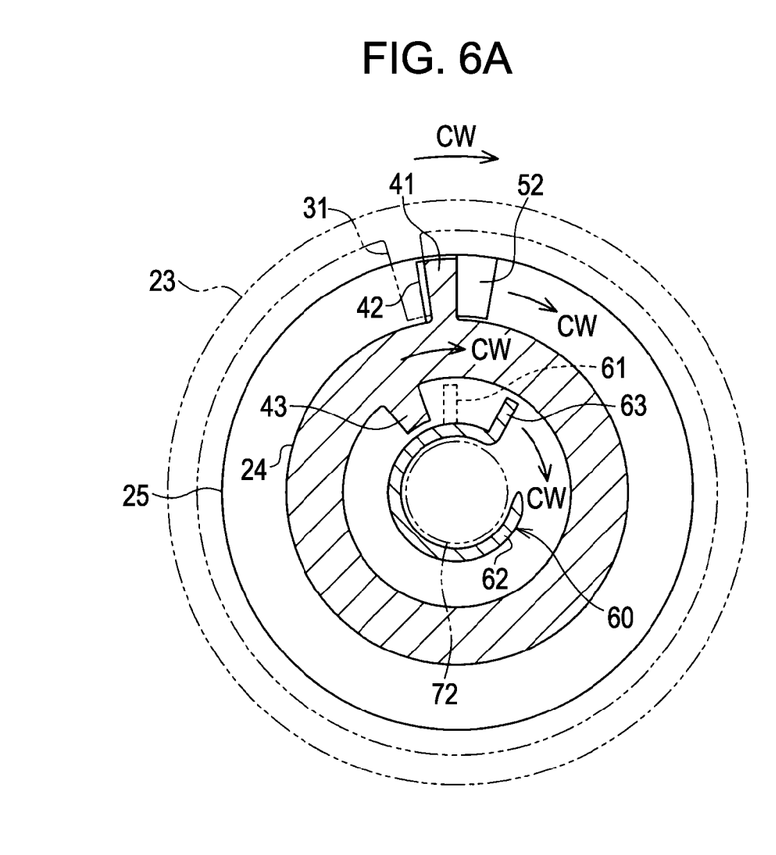
FIG. 6A is an explanatory schematic view of the driven rotatable member, illustrating the rotary operation in which the driven rotatable member is in a state of a suction operation.
Figure 6B:
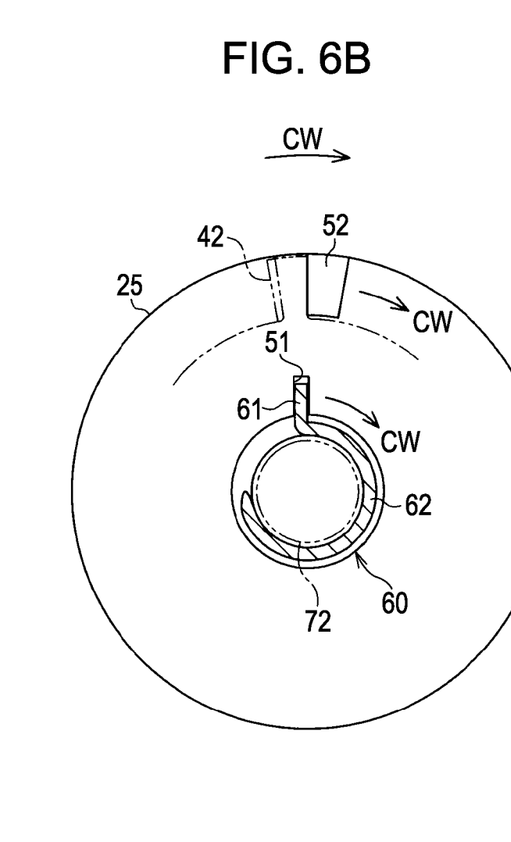
FIG. 6B is an explanatory schematic view of the rotation-regulating member, illustrating an operation in which the rotation-regulating member is in the state of the suction operation.

Referring to FIG. 6A and FIG. 6B, an operation of the driven rotatable member 25 is explained below.

As shown in FIG. 6A, when the transmission gear 23 rotates in the direction CW together with the rotation of the motor 20, the projection 31 of the transmission gear 23 comes into contact with the projection 41 of the rotation transmission member 24 and then the projection 31 pushes the projection 41 while maintaining the contact state therebetween. Consequently, the rotation transmission member 24 rotates in the direction CW. As a result of the rotation of the rotation transmission member 24 in the direction CW, the projection 42 of the rotation transmission member 24 comes into contact with the projection 52 of the driven rotatable member 25 and the member 24 begin to turn the member 25 in the direction CW. At this time, the projection 43 of the rotation transmission member 24 is located at a position where the projection 43 is not in contact with the second bent-up end 63 of the coil main body 62. On the other hand, as shown in FIG. 6B, since the first bent-up end 61 secured to the slit 51 in the driven rotatable member 25 is rotated in the direction CW together with the rotation of the driven rotatable member 25, the inner diameter of the coil main body 62 increases and the coil main body 62 begins to rotate in the direction CW while sliding along the large-diameter shaft portion 72 (the stationary shaft 70).

As shown in FIG. 6A, the second bent-up end 63 rotates in the direction CW together with the rotation of the coil main body 62 so as to follow the first bent-up end 61. As a result, the second bent-up end 63 becomes spaced away from the projection 43 provided on the rotation transmission member 24 rotating in the direction CW and is not rotated in the direction CW by the projection 43. Accordingly, since a force that tightens the coil main body 62 is not applied to the second bent-up end 63, the inner diameter of the coil main body 62 is increased by the rotation of the first bent-up end 61 in the direction CW and the coil spring 60 rotates in the direction CW while sliding along the large-diameter shaft portion 72 (the stationary shaft 70). The projection 43 and second bent-up end 63 are provided on the rotation transmission member 24 and coil spring 60, respectively so that the projection 43 and the second bent-up end 63 are not in contact with each other and are spaced away from each other when they rotate in the direction CW.

Next, an operation in which the driven rotatable member 25 rotates in the direction CCW is explained below.

As shown in FIG. 5, the projection 52 of the driven rotatable member 25 is released from the state in which the projection 52 is being pushed by the projection 42 of the rotation transmission member 24. When the driven rotatable member 25 stops rotating in the direction CW, the driven rotatable member 25 may receive a force for rotating the member 25 in the direction CCW on account of a reaction force that the rollers 73 pressing the flexible tubes 16 receive from the tubes 16, as described above. At this time, the force may be applied to the first bent-up end 61 of the coil spring 60 to rotate the first bent-up end 61 in the direction CCW. Even if the first bent-up end 61 of the coil spring 60 is turned in the direction CCW by the action of the force, since the inner diameter of the coil main body 62 is reduced on the stationary shaft 70 (the large-diameter shaft portion 72), the coil spring 60 is restrained from rotating in the direction CCW. That is, in a state in which the rotation transmission member 24 does not transmit the rotation of the transmission gear 23 to the driven rotatable member 25, the coil spring 60 restrains only the driven rotatable member 25 from rotating in the direction CCW opposite to the suction direction.

Furthermore, in the embodiment, after the driven rotatable member 25 stops rotating in the direction CW and the transmission gear 23 rotates by a given rotation angle in the direction CCW, the driven rotatable member 25 begins to rotate in the direction CCW. That is, in the pump apparatus 11, the transmission gear 23 has this given rotation angle range as an unable-to-transmit rotary range in which the transmission gear 23 rotates in a state in which the driving force of the motor 20 is not transmitted to the driven rotatable member 25.

The rotating operation of the driven rotatable member 25 is explained below by referring to FIG. 7A and FIG. 7B.

Figure 7A:
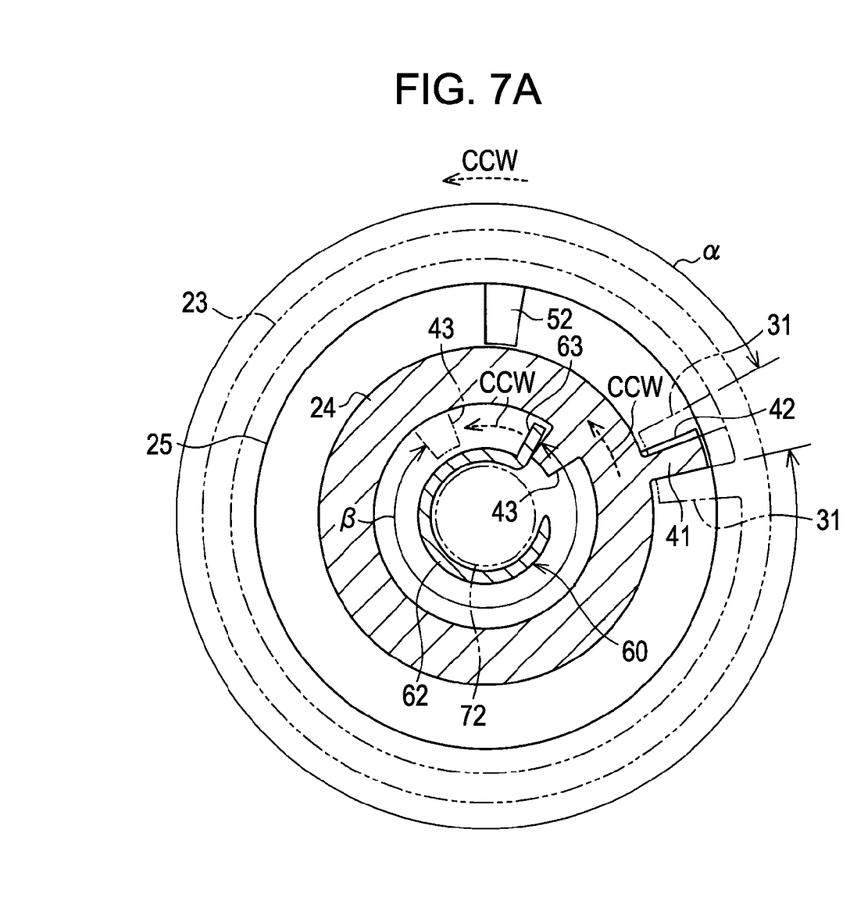
FIG. 7A is an explanatory schematic view of the driven rotatable member, illustrating a midstream rotating state of shifting the driven rotatable member from a suspended state of the suction operation to a released state of the suction operation.

As shown in FIG. 7A, when the transmission gear 23 changes from the rotation in the direction CW to the rotation in the direction CCW together with the rotation of the motor 20, the transmission gear 23 rotates by an angle α (alpha) from a position (shown by two-dot chain lines in FIG. 7A) where the projection 31 of the transmission gear 23 contacts the projection 41 of the rotation transmission member 24 when the gear 23 rotates in the direction CW to a position where the projection 31 comes into contact with the opposite side of the projection 41.

Thereafter, the transmission gear 23 continues to rotate in the direction CCW while being in contact with the projection 31 with the projection 41 and further rotates by an angle β (beta) in the direction CCW from a position (shown by two-dot chain lines in FIG. 7A) where the projection 43 of the rotation transmission member 24 exists when the transmission gear 23 rotates in the direction CW to a position where the projection 43 comes into contact the second bent-up end 63 of the coil spring 60. That is, the second bent-up end 63 of the coil spring 60 serves as an engaging portion that can contact the projection 43 of the rotation transmission member 24. The transmission gear 23 maintains the state in which the projection 31 is not in contact with the second bent-up end 63 of the coil spring 60, after the transmission gear 23 stops rotating in the direction CW, and before the transmission gear 23 rotates in the direction CCW by a given angle range obtained by adding the angle α (alpha) to the angle β (beta). In the unable-to-transmit rotary range in which the rotation transmission member 24 does not transmit the rotation of the transmission gear 23 in the direction CCW, even if the driven rotatable member 25 begins to rotate in the direction CCW opposite to the suction direction, the coil spring 60 restrains the driven rotatable member 25 from rotating.

Thereafter, when the rotation transmission member 24 continues to rotate in the direction CCW, the projection 43 of the rotation transmission member 24 begins to rotate the second bent-up end 63 in the direction CCW. At this time, since the second bent-up end 63 of the coil spring 60 is rotating in the direction CCW, the inner diameter of the coil main body 62 increases and the coil main body 62 begins to rotate in the direction CCW while sliding along the large-diameter shaft portion 72 (the stationary shaft 70).

Figure 7B:
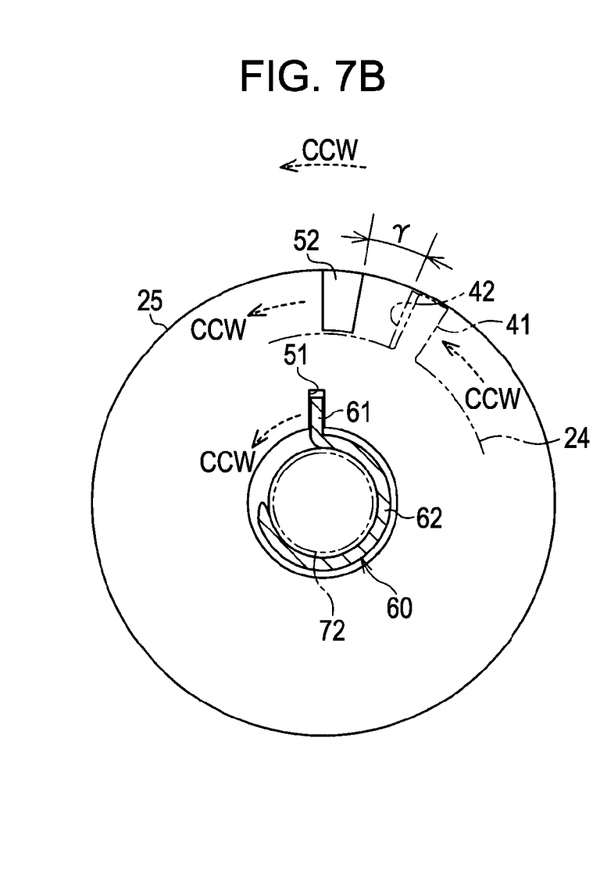
FIG. 7B is an explanatory schematic view of the rotation-regulating member, illustrating a midstream rotating state of shifting the rotation-regulating member from the suspended state of the suction operation to a released state of the suction operation.

As shown in FIG. 7B, the first bent-up end 61 of the coil spring 60 begins to rotate in the direction CCW and to follow the second bent-up end 63 together with the rotation of the coil main body 62. Consequently, since the first bent-up end 61 is fixed in the slit 51 of the driven rotatable member 25, the first bent-up end 61 turns the driven rotatable member 25 in the direction CCW. Thus, the driven rotatable member 25 begins to rotate in the direction CCW together with the rotation of the coil spring 60.

In the embodiment, when the driven rotatable member 25 rotates in the direction CCW, the rotation transmission member 24 rotates in the direction CCW so as to maintain a position where the projection 42 of the rotation transmission member 24 is spaced away from the projection 52 of the driven rotatable member 25 by a given angle, for example, an angle γ (gamma) larger than zero degrees in order that the projection 42 is not in contact with the projection 52. Accordingly, since the force that tightens the coil main body 62 is not applied to the first bent-up end 61, the inner diameter of the coil main body 62 of the coil spring 60 is increased by the rotation of the second bent-up end 63 in the direction CCW and the coil spring 60 rotates in the direction CCW while sliding along the large-diameter shaft portion 72 (the stationary shaft 70). Accordingly, the projection 42 is provided on the rotation transmission member 24 so that the projection 42 is not contact with the projection 52 and is spaced away from the projection 52 during the rotation in the direction CCW.

The embodiment described above can obtain the following effects.

(1) Since the rotation in the direction CCW opposite to the direction in which the driven rotatable member 25 performs the suction operation is restrained by the coil spring 60 that is being tightened, the suction pump 17 maintains a state in which the rollers 73 press the flexible tubes 16, that is, the state of the suction operation when the suction operation is stopped.

(2) In the case where the rollers 73 release the state of pressing the tubes 16 in the suction pump 17, since the driven rotatable member 25 is turned so that the second bent-up end 63 of the coil spring 60 is loosened on the stationary shaft 70, it is possible to turn the driven rotatable member 25 with a low load. Accordingly, it is possible to share the driving force (the load) of the motor to operations other than the driving operation for the suction pump 17.

(3) Since the coil spring 60 rotates on the stationary shaft 70 in the state of loosening the coil spring 60 when the driven rotatable member 25 is rotated in the direction CW by the driving force transmitted from the motor 20 to perform the suction operation, the driven rotatable member 25 can carry out the suction operation with a low load.

(4) While the rollers 73 continue to press the tubes 16 in the suction pump 17, it is possible to utilize the driving force of the motor 20 in operations other than the suction operation. Accordingly, in the unable-to-transmit rotary range in which a rotation power is not transmitted to the driven rotatable member 25, that is, in a rotation range of the transmission gear 23, it is possible to share the driving force of the motor 20 to another operation and to immediately perform the suction operation in the case of currying out the suction operation again.

(5) Since the coil spring 60 having the coil main body 62 that is wound helically by at least one turn realizes a rotation-regulating member, it is possible to construct a rotation-regulating member having a simple structure.

The above embodiment may be modified to obtain the following embodiments.

A winding direction of the wire material for the coil main body 62 of the coil spring 60 in the above embodiment need not be the left-hand screw direction. For example, in the case where the suction operation of the suction pump 17 is performed when the pump shaft 78 is rotated in a direction opposite to the direction in the above embodiment, that is, not in the direction CW but in the direction CCW, the winding direction of the wire material for the coil main body 62 may be a right-hand screw direction.

The rotation-regulating member in the above embodiment is not always limited to the coil spring 60. For example, the rotation-regulating member may be a plate-like member that has a cylindrical winding-portion wound on the stationary shaft 70 (the large-diameter shaft portion 72) by more than a half turn and that is formed so as to have a C-ring-like shape in cross section in a direction that intersects the axis of the stationary shaft 70.

Although the transmission gear 23 and rotation transmission member 24 serve as a driving-force transmission assembly in the above embodiment, this need not be the case. The transmission gear 23 and rotation transmission member 24 may be integrated with each other. In this case, the unable-to-transmit rotary range becomes an angle range reduced by the angle α (alpha) in the above embodiment.

The above embodiment need not always be provided with the unable-to-transmit rotary range in which the rotation transmission member 24 rotates in a state in which the motor 20 does not transmit its driving force to the driven rotatable member 25. For example, in FIG. 2, in the case where the rotation of the intermediate gear 22 is transmitted to the transmission gear 23 only when the rotation of the intermediate gear 22 rotates the transmission gear 23 in the direction CW, the unable-to-transmit rotary range is not provided in the transmission gear 23 or the rotation transmission member 24.

In the above embodiment, the rotation transmission member 24 does not always contact the second bent-up end 63 of the coil spring 60 to rotate the coil spring 60 in the direction CCW. For example, in the case where it is not necessary to release the flexible tubes 16 from the pressing state in the suction pump 17, since it is not necessary to rotate the driven rotatable member 25 in the direction opposite to the direction in which the suction operation is performed, the coil spring 60 need not to rotate in the direction CCW.

Although the two flexible tubes 16 are arranged at positions along the axial direction of the pump shaft 78 in the suction pump 17 and the suction pump 17 rotates while pressing the tubes 16 in the above embodiment, this need not always be the case. At least one flexible tube 16 may be provided. The tubes 16 need not be located along the pump casing 77 in the semi-circular shape and the whole periphery of the tubes 16 may be pressed by the rollers 73.

Although the rotary members such as the transmission gear 23 and the rotation transmission member 24 constitute the driving-force transmission assembly in the above embodiment, this need not always be the case. The driving-force transmission assembly may adopt a sliding member that rotates the driven rotatable member 25 by a reciprocating movement of, for example, a rack. That is, by engaging teeth on the reciprocation rack with teeth on the driven rotatable member 25, the driven rotatable member 25 may be rotated to transmit the driving force of the motor 20 to the driven rotatable member 25.

The pump apparatus 11 in the above embodiment is realized as a pump apparatus to be used in a maintenance system provided in an ink jet printer that ejects an ink. However, the pump apparatus 11 may be realized as a pump apparatus to be used in a liquid ejecting apparatus that ejects or discharges a liquid other than the ink. The pump apparatus 11 can be diversely applied to various kinds of pump apparatuses provided with a liquid ejecting head or the like that discharges minute liquid droplets. The term "liquid droplets" mentioned here refers to the state of a liquid discharged from the liquid ejecting apparatus and its meaning includes a droplet that has a grain-like shape, a tear-like shape, a stringy shape, and the like. The term "liquid" mentioned here means a material that the liquid ejecting apparatus can eject. The liquid may be any substance so long as the substance is in a liquid phase. For example, examples of the liquid may include: a fluid substance such as a liquid having a high or low viscosity, a sol, a gel water, an inorganic solvent, an organic solvent, a solvent, a liquid resin, and a liquid metal (a molten metal); or a substance, in which particles of a functional material composed of a solid matter such as a pigment or metal particles are dissolved, dispersed, or mixed in a solvent, as well as a liquid-phase substance. A typical example of a liquid is an ink described in the above embodiment, a liquid crystal, or the like. The term "ink" mentioned here includes a common water-color ink, an oil-based ink, and an ink containing a liquid composition such as a gel ink and a hot-melt ink.

An example of the liquid ejecting apparatus is a liquid ejecting apparatus that ejects a liquid containing a dispersed or dissolved material such as an electric pole material and a color material to be used to produce, for example, a liquid crystal display, an EL (electro luminescence) display, a surface light-emitting display, and a color filter. In addition, other examples of the liquid ejecting apparatus include a liquid ejecting apparatus that ejects biological matter to be used to produce a biochip, a liquid ejecting apparatus that ejects a liquid that will become a sample to be used by a precision pipette, a textile printing apparatus, and a microdispenser. Furthermore, examples of the liquid ejecting apparatus may include a liquid ejecting apparatus that ejects a lubricating oil onto a precision machine such as a watch and a camera in a pinpoint manner, a liquid ejecting apparatus that ejects a transparent resin such as a UV-curable resin onto a substrate in order to produce a micro hemispherical lens (an optical lens) to be used in an optical communication device, or a liquid ejecting apparatus that ejects an etching liquid such as an acid or an alkali in order to etch a substrate. The invention can be applied to a pump apparatus to be used in one of these liquid ejecting apparatuses.

What is claimed is:

1. A pump apparatus comprising:
   a stationary shaft;
   a rotation-regulating member having a coil main body wound around the stationary shaft, the rotation-regulating member being permitted to rotate in a direction of loosening of the coil main body to increase a diameter of the coil main body and the rotation-regulating member being restrained from rotating in a direction of tightening of the coil main body to decrease the diameter of the coil main body;
   a driven rotatable member to which an end of the coil main body of the rotation-regulating member is attached, the driven rotatable member being able to rotate around the stationary shaft when a driving force of a driving source is transmitted to the driven rotatable member;

a driving-force transmission assembly that transmits the driving force of the driving source to the driven rotatable member; and a suction pump having a rotary member that is driven together with rotation of the driven rotatable member, the suction pump being configured to perform a suction operation when the rotary member rotates while pressing a flexible tube;

wherein the suction pump is configured such that the rotation-regulating member rotates in the tightening direction of the coil main body when the driven rotatable member rotates in a direction opposite to a direction in which the driven rotatable member performs the suction operation, wherein when the driving-force transmission assembly contacts the rotation-regulating member, the driving-force transmission assembly turns the rotation-regulating member in the loosening direction such that the diameter of the coil main body is increased and turns the driven rotatable member in a direction opposite to the rotary direction in which the suction operation is performed.

2. The pump apparatus according to claim 1,
wherein the coil main body of the rotation-regulating member is provided on the other end thereof opposite to the end thereof attached to the driven rotatable member with a contact portion that the driving-force transmission assembly may contact.

3. The pump apparatus according to claim 2, wherein the suction pump performs the suction operation, when the driving force is transmitted from the driving-force transmission assembly to the driven rotatable member and the driven rotatable member rotates in the loosening direction of the coil main body of the rotation-regulating member.

4. The pump apparatus according to claim 2, wherein the driving-force transmission assembly has an unable-to-transmit rotary range in which the driving force of the driving source is not transmitted to the driven rotatable member during a period from a time when the driving force of the driving source is transmitted to the driven rotatable member by the rotation of the driving-force transmission assembly to cause the suction pump to perform the suction operation to a time when the driving force of the driving source is transmitted to the driven rotatable member in a rotary direction opposite to the rotary direction in which the suction operation is performed.

5. The pump apparatus according to claim 1, wherein the rotation-regulating member includes the coil main body that has at least one helical turn.

\* \* \* \* \*